(12) United States Patent
Love et al.

(10) Patent No.: US 6,904,020 B1
(45) Date of Patent: Jun. 7, 2005

(54) SYSTEM AND METHOD FOR MONITORING COMMUNICATION NETWORKS USING DATA STREAM CHARACTERIZATION

(75) Inventors: Simon Love, Edinburgh (GB); Graham S. Pollock, Cupertino, CA (US); Patrick Goldsack, Bristol (GB); Evan R. Kirshenbaum, Mountain View, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 763 days.

(21) Appl. No.: 09/703,542

(22) Filed: Nov. 1, 2000

(51) Int. Cl.$^7$ ............................................. G08C 15/00
(52) U.S. Cl. ..................................... 370/252; 370/400
(58) Field of Search ............................... 370/241, 252, 370/254–255, 257–258, 351, 400

(56) References Cited

U.S. PATENT DOCUMENTS

| | | | |
|---|---|---|---|
| 4,817,080 A | | 3/1989 | Soha |
| 5,430,709 A | * | 7/1995 | Galloway ................... 370/241 |
| 5,450,408 A | | 9/1995 | Phaal |
| 5,793,753 A | * | 8/1998 | Hershey et al. ............. 370/252 |
| 5,886,643 A | * | 3/1999 | Diebboll et al. ............ 709/224 |
| 5,926,463 A | * | 7/1999 | Ahearn et al. ............... 370/254 |
| 6,046,988 A | | 4/2000 | Schenkel et al. |
| 6,356,551 B1 | * | 3/2002 | Egbert ........................ 370/389 |

FOREIGN PATENT DOCUMENTS

WO    WO 00/05594    7/1999

* cited by examiner

Primary Examiner—Chi Pham
Assistant Examiner—Keith M. George (57) ABSTRACT

A system and method for automatically monitoring communications networks and for determining network configuration use data stream characterizations. The system comprises a plurality of measurement probes that passively probe the network and collect data packets carried by data streams in the network. The system further comprises characterization computational units that process the collected data packets and produce data stream characterizations from the collected data packets. The data stream characterizations represent individual data streams in an arbitrarily unique manner. The system still further comprises a configuration processing unit that compares data stream characterizations taken at different points in the network and determines data stream paths through the network based on data stream characterization matching. The method for automatically monitoring communications networks comprises the steps of passively probing the data streams to produce sets of collected data packets from the data streams, determining data stream characterizations from the collected data packets, and comparing the data stream characterizations to one another to identify matching characterizations.

20 Claims, 7 Drawing Sheets

*Prior Art*

FIG. 1C

*Prior Art*

SYSTEM AND METHOD FOR MONITORING COMMUNICATION NETWORKS USING DATA STREAM CHARACTERIZATION

TECHNICAL FIELD

The invention relates to monitoring of communications networks. In particular, the invention relates to automatically detecting and monitoring the configuration of and other parameters associated with communications networks.

BACKGROUND ART

A communications network is a collection of nodes or elements interconnected by a plurality of paths or communication channels. The communication channels carry data from one node to another. The data moving between nodes is referred to as a data stream. Nodes may be either the source or destination of one or more data streams. When a node is acting as either a source or a destination (i.e. sink) for a data stream, the node is often referred to as an endpoint or an end station. In addition to nodes that are endpoints, networks may contain a plurality of nodes that act as switching elements. Switching elements or simply switches are nodes used for routing or relaying data streams from one communication channel to another within the network. As such, switches are responsible for dynamically routing data streams through the network from their source to their destination. Switching elements can also act as a source or destination of a data stream combining the switch and endpoint in a single node.

Figure 1A:
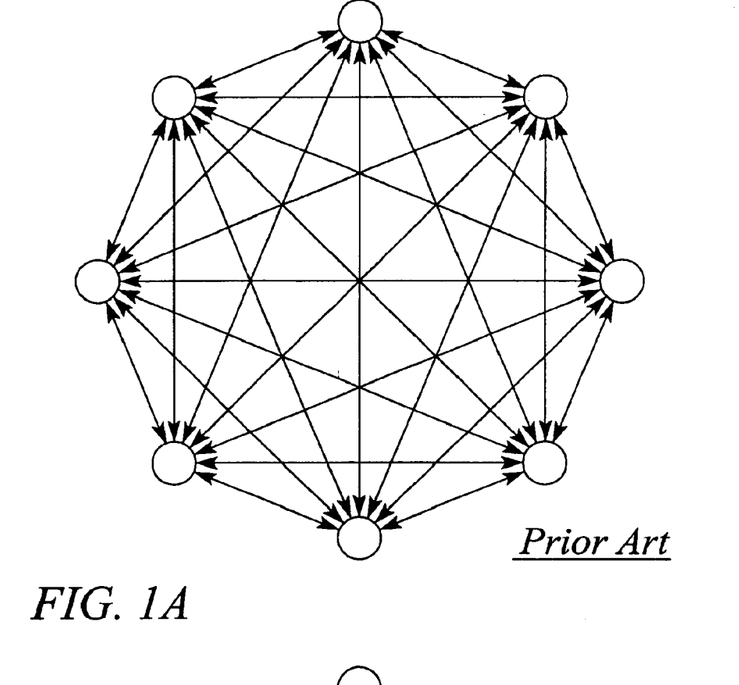
FIGS. 1A–1D illustrates four basic conventional physical network topologies.
Figure 1B:
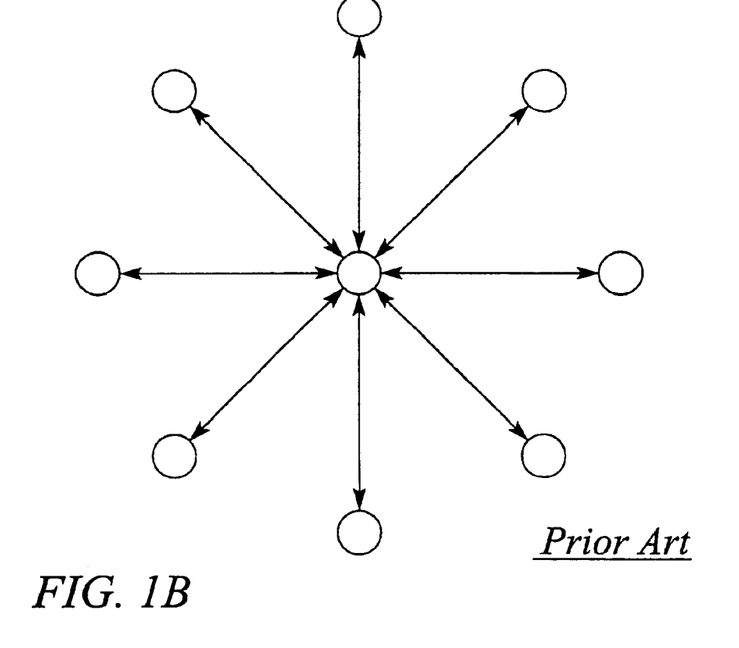
Figure 1C:
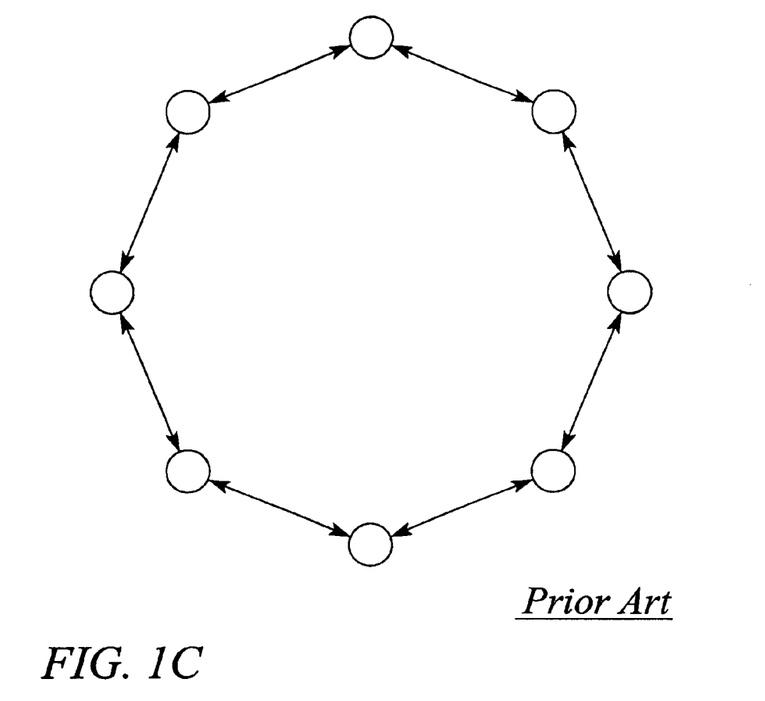
Figure 1D:
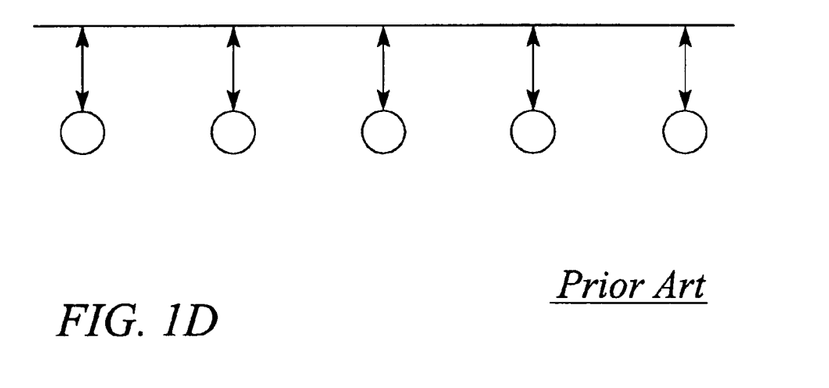

Communications networks can have many physical topologies based on the arrangement of their physical connections or channels and the types of nodes that they contain. These physical topologies range from fully meshed to very simple ring or linear topologies. Four of the basic topologies are illustrated in FIGS. 1A–1D. FIG. 1A illustrates a fully meshed topology in which all nodes are connected by a physical channel to all other nodes. In the fully meshed topology all of the nodes are endpoints and no switches are required. FIG. 1B illustrates a star topology in which all nodes are connected to a central hub. The central hub is a node that acts as a switch for routing data from one endpoint node to another in the star topology. FIG. 1C illustrates a ring topology. In the ring topology nodes are connected to only two other nodes by physical channels. All nodes act as switches and as endpoints in networks based on the ring topology of FIG. 1C. FIG. 1D illustrates a linear topology in which all nodes share a common channel. No switch is required for this network topology. Nodes communicate with each other by time-sharing the channel. This topology is embodied in the IEEE 802.3 Ethernet standard for computer networking.

Even though a physical network topology may be sparsely meshed in terms of physical connections as in the case of the ring topology, the network may still be fully meshed in terms of the 'virtual' connections that can be produced in the network by virtue of the action of the switches. For example, if all of the nodes in the ring topology are capable of acting as switches, every node can communicate with every other node. The signal simply passes through several nodes and several physical channels as it travels between the source and destination nodes. The path taken by the signal, while not a single physical path, can be thought of as a virtual path.

Therefore, it is often useful to distinguish between communication channels or connections between nodes that are actual, physical connections and ones that are virtual connections. The term 'physical connection', as used herein, refers to a physical link or channel between a pair of nodes. The physical connection may consist of a wired or wireless transmission channel. The term 'virtual connection', as used herein, refers to a link or channel between nodes that may be inferred by the operation of the network. Virtual connections are generally created in a network by switching data streams through one or more physical connections. A virtual connection is sometimes referred to as a virtual circuit.

Modern communications networks are generally defined in terms of the virtual connections that are utilized and the manner in which they are created, managed and destroyed. The configuration of these networks tends to be highly dynamic with virtual connections being created and destroyed on an as needed basis. Therefore, most modern networks require some form of network monitoring to keep track of these virtual connections. In fact, in many modern networks, monitoring is a critical factor for insuring network operation.

Since modern communication networks can be quite large and complex, monitoring typically involves tracking a large number of parameters associated with the network. Among the parameters that are often monitored are the performance and health of network elements, channel loading vs. capacity, and network configuration defined by the current set of virtual connections. Of particular interest in dynamic, modern networks is the monitoring of the network configuration.

Network monitoring is often performed by a specialized system called a communications network monitoring system (NMS). There are two principal approaches to monitoring the configuration of a network employed by the typical NMS: (a) manual configuration monitoring and (b) automatic configuration monitoring. Most existing monitoring systems use the manual approach.

The manual approach generally utilizes a human operator to enter or record the configuration information in a system configuration repository or memory area. While simple to implement, the manual approach has the chief disadvantage that it does not scale well as the network grows in size and complexity. As the network grows in size, the number of data streams increases. Concomitantly, the time spent manually entering the information by the human operator increases. The time that it takes to manually enter configuration information into the system configuration repository can and does cause the recorded configuration to fall behind or 'lag' the real configuration. At some point as the network size continues to increase, the correspondence between the recorded configuration and the real configuration will fail to meet the requirements of the system for proper operation.

Similarly, highly dynamic networks pose a problem for the manual approach. If the configuration is changing rapidly with time, it may be difficult or impossible for the human operator to keep up with the changes. Large networks with correspondingly large numbers of dynamically changing data streams or virtual connections can simply become too complex for a human operator to monitor effectively. In the worst case, manual entry of configuration information is so slow relative to the changing nature of the network configuration that it is rendered utterly useless. In these cases, manual entry is not a viable approach to network monitoring and an automatic approach must be used. Even when the manual approach is viable, network performance can suffer due to the lag that existing between the true configuration and the recorded configuration.

Automatic configuration monitoring attempts to solve the problems associated with monitoring of the network configuration by removing the human operator as much as is possible. Several schemes or approaches have been developed to accomplish automatic communication network monitoring.

In one scheme, a configuration processing function is integrated with existing computerized sources of data stream information. For example, the configuration processing function might be integrated into an Operation Support System (OSS) used by the owner or operator of the network. The OSS is an external system, often operated in batch mode, which collects and disseminates network configuration and status information. Since the OSS is typically run in batch mode, the recorded configuration data it contains often lags the real or true configuration by a significant amount. In addition, the OSS used by the network owner often includes proprietary interfaces and may still require a high degree of manual data entry leading to possible inaccuracies and a lack of correspondence between the data and the true network configuration. Ultimately this lack of correspondence leads to a need for a conflict resolution process when it is found that the automated source of configuration data does not agree with reality in the monitored network.

Another automated network monitoring scheme involves actively injecting traffic with known characteristics into the network and monitoring the physical links within the network in order to discover the path or virtual connection over which the data travels. The injected traffic is generally test data with a know pattern that has a low probability of occurring in normal network operation. This scheme that uses 'active' probing of the network structure has the disadvantage of requiring access to the network to enable injection of the test data traffic. In addition, this scheme can be disruptive to normal network operation because it prevents normal usage of the data streams while they are under test.

A related scheme to that of injecting test traffic is to observe data in the header fields of the packets carried by the data streams of the network at various points in the network. By tracking the progress of a set of specific header field patterns as they traverse the network, the configuration can be determined. This scheme does not require the injection of test traffic. Therefore this scheme tends to avoid the problems associated with disrupting the normal network operation of the previous scheme. However, this scheme does not work for all networks since the header fields in some networks are altered by the switching elements of these networks as a part of normal operation. Once altered, the header fields become useless for tracking the path of a is given packet.

Yet another automated approach to network configuration monitoring is the use network management protocols such as Simple Network Management Protocol (SNMP) or Common Management Information Protocol (CMIP) to query the Management Information Base (MIB) of the switching elements for configuration information contained in their respective routing tables. This approach has the disadvantage of requiring a complex interaction between the switching elements and the management system. Additionally, this scheme does not scale well as the number of elements to be queried becomes large. Finally this scheme increases the processing burden of the switching elements since they must handle data traffic at the same time as responding to the query from the monitoring system. In the worst case, the switching elements will simply ignore 'non-essential' monitoring queries during periods of high load and the monitoring system will not receive accurate configuration data in a timely manner.

Finally, some networks may be automatically monitored by observing packets in the signaling messages of the network. Signaling messages are message streams that exist in some networks that carry and disseminate various types of controlling information within the network. Often signaling messages are carried in channels that exist outside of the normal network data streams. These signaling message data packets generally carry sufficient information to enable the monitoring system to 'work out' the network configuration. However, this approach does not work for all networks since some do not use signaling messages.

Thus, it would be advantageous to have an automatic network configuration monitoring system that detects or "discovers" the network configuration in a passive, non-invasive observation of normal network traffic. Having an automatic system eliminates the problems of manual entry. It would be desirable that such an automatic monitoring system be capable of monitoring the network in a continuous manner instead of a batch manner to minimize the discrepancies between the true network configuration and the recorded configurations. In addition it would be desirable that such a system be relatively independent of the network being monitored, rendering such a system widely applicable to a variety of networks. Such an automatic network configuration monitoring system would solve a long-standing need in the area of communication network monitoring.

SUMMARY OF THE INVENTION

The present invention provides a novel system and method of monitoring the configuration of the virtual circuits in a communication network in a passive, non-invasive way. The normal network traffic is observed and characterized without interference. The monitoring system and method utilize samples of normal data traffic passively extracted by measurement probes connected to the network at any number of points to perform its functions. The system and method are readily automated to provide continuous monitoring. The system and method are independent of the communications network being monitored and therefore, are applicable to a wide variety of network types.

In one aspect of the invention, a system for monitoring a communications network is provided. The system monitors communications networks that have data streams that carry data packets between a plurality of nodes by way of physical connections. The system comprises a plurality of measurement probes, each probe for passively sampling the data stream and collecting the data packets carried by a data stream to produce a set of collected data packets. The system further comprises a plurality of characterization computational units, each characterization unit for receiving the set of the collected data packets from a respective one of the probes and for producing a data stream characterization from the set. The system still further comprises a configuration processing unit for generating a system configuration from the data stream characterization.

In another aspect of the invention, a method of monitoring a communications network having data streams that carry data packets between a plurality of nodes by way of physical connections is provided. The method of monitoring comprises the step of passively probing one or more of the physical connections to produce one or more sets of collected data packets from the data streams. The method further comprises the step of determining a data stream characterization from each of the sets of collected data packets. The method still further comprises the step of comparing the data stream characterizations to one another to identify matching characterizations. In a preferred embodiment, the step of determining comprises the steps of recording peripheral information associated with the data stream characterization, and computing an array of values from an invariant portion of the set of collected data packets.

In still another aspect of the invention, methods of computing an array of values are provided. In one embodiment, the array of values is computed with a novel hash characterization method. In another embodiment, the array of values is computed with a novel count characterization method. In still another embodiment, the array of values is computed with a novel interval characterization method. Further, the data stream characterization can be determined by computing the array of values using a novel multi-packet characterization method in yet another embodiment.

The system and methods of the present invention advantageously provide a mechanism for efficiently representing the traffic carried by a data stream as seen at a particular measurement point during a specified time window with a set of parameters derived by observing the packets carried by the data stream during the specified time window. Further, the system and methods provide that data stream characterizations be compared in order to identify the physical path that a data stream takes through a communications network. Still further, the system and methods of the present invention can be applied to networks with many different topological configurations.

The system and methods of the present invention advantageously eliminate the need for manual entry of data stream configuration information, as this information is 'discovered' by observing the normal traffic carried by the network. Further, the present invention does not require access to external sources of data stream information. More advantageously, the system and methods of the present invention depend only on passive access to the physical links of the network and do not degrade the performance or availability of the network. Still further, the system and methods derive data stream characterizations on a continuous basis, and can be used to discover new data streams in a dynamically evolving network.

BRIEF DESCRIPTION OF THE DRAWINGS

The various features and advantages of the present invention may be more readily understood with reference to the following detailed description taken in conjunction with the accompanying drawings, where like reference numerals designate like structural elements, and in which.

MODES FOR CARRYING OUT THE INVENTION

The present invention is a system and method for automatically detecting and monitoring the configuration of virtual circuits in a communications network utilizing data stream characterizations obtained by passive collecting and measuring data packets at one or more locations within a communications network. With the present invention, network traffic in the form of data packets carried by a data stream is represented by a set of data stream parameters derived from measurements taken on the packets. The derived set of data stream parameters represents the network traffic at a specific point in the network and is referred to as a 'data stream characterization' hereinbelow. A plurality of data stream characterizations taken at a plurality of points within the network is used to generate the configuration of the virtual circuits in the network.

The data stream characterizations of the present invention are produced such that the statistical probability of any two different data streams having the same characterization at the same point in time is arbitrarily small. Therefore, data stream characterizations act as unique markers or fingerprints for tracking the flow of data through the network. The system and method of the present invention monitor the network by tracking and comparing data stream characterizations taken at different points in the network.

Figure 2:
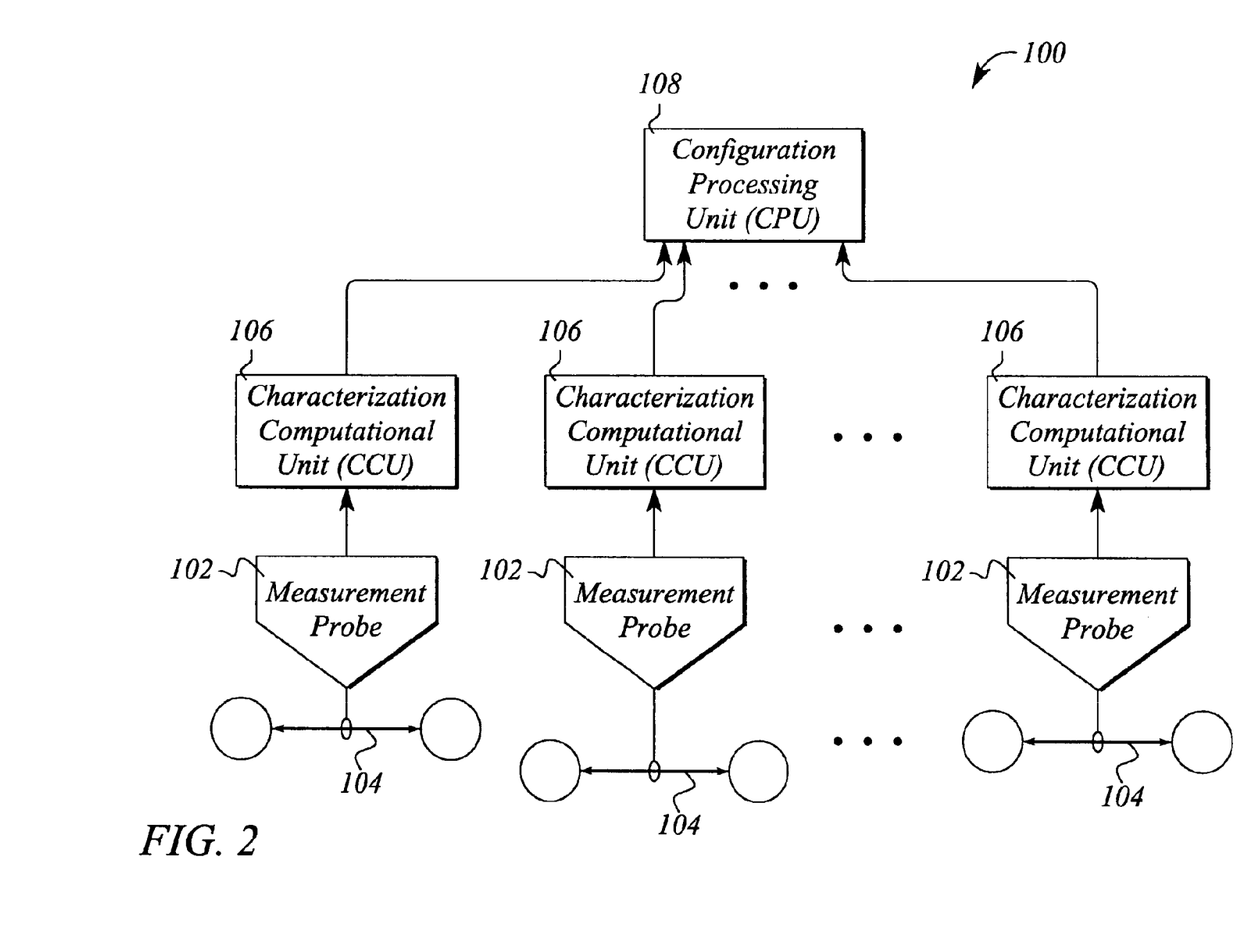
FIG. 2 illustrates a block diagram of a communications network monitoring system of the present invention.

FIG. 2 illustrates a block diagram of a system 100 of the present invention. The system 100 comprises a plurality of measurement probes 102 that passively monitor or observe data streams within the communications network. Each measurement probe 102 passively observes and collects a set or sequence of data packets from one of the physical connections 104 within the network. The physical connections 104 are illustrated as double-headed arrows between nodes, illustrated as circles in FIGS. 2–3. Preferably each measurement probe 102 collects a set of contiguous data packets. The set of data packets are collected during a specified time window. Alternatively, a specified number of data packets are collected following a given, predetermined, starting time or after the occurrence of a specified data pattern in an invariant portion of one or more of the observed packets.

Figure 3:
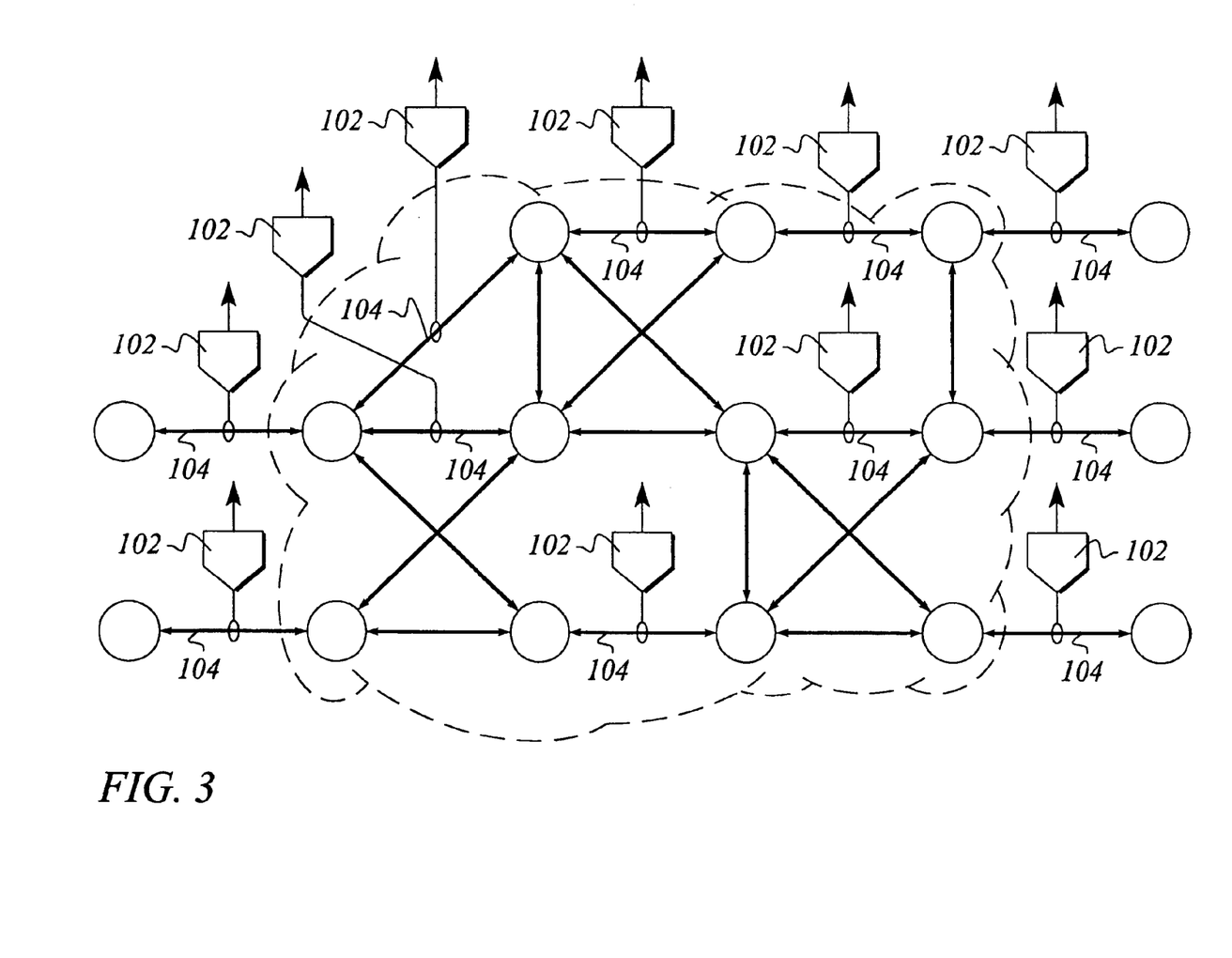
FIG. 3 illustrates a block diagram of a communication network depicting an interface between the network and the monitoring system of the present invention.

FIG. 3 illustrates an interface between a typical network and the probes 102 of the system 100 of the present invention. In the system 100 of the present invention, data packets in a data stream are observed and collected by passively 'tapping' into the physical links in the network and feeding copies of the packets to the plurality of measurement probes 102. The measurement probes 102 provide a means for passively tapping into the network, copying and collected data packets. The specific embodiment of the measurement probes 102 depends on the network being monitored.

An example of a probe 102 useful for an IEEE 802.3 Ethernet or Asynchronous Transfer Mode (ATM) networks is a high impedance logic probe. The high impedance logic probe can be connected directly to one of the transmission wires of the network and collect copies of the data packets in the network without interfering with the normal flow traffic. In another example for a different network, the probe 102 might be an inductively or capacitively coupled logic probe. In yet another example, the probes 102 might be built into the logic circuitry of the nodes such that copies of raw data packets are fed to an output port on the node. A variety of different probes 102 may be used on a single network as deemed appropriate. One skilled in the art would readily be able to determine an appropriate probe 102 to use for a given network without undue experimentation.

Probes 102 may be positioned to observe some or all of the physical connections or links 104 within the network. The choice of the location of the probes 102 and the number of sampled links 104 depends on the level of monitoring detail desired.

The system 100 further comprises one or more characterization computational units (CCUs) 106. Each CCU 106 produces one or more data stream characterizations from one or more sets of data packets collected by a probe 102. In the preferred embodiment, the CCU 106 is incorporated in the probe 102. The CCU may be implemented as a general-purpose computational element using a microprocessor or may be implemented using custom or semi-custom computational hardware as in the case of using a digital signal processor (DSP) or an application specific integrated circuit (ASIC). In some cases one or more CCUs might be combined in a single, sufficiently powerful computational element.

A data stream characterization comprises a sequence or string of values derived from the set of data packets. In addition, the characterization may include associated information regarding the location and time that the characterization was produced. The CCU 106 and the characterization produced thereby utilize an invariant portion of the collected data packets to compute the data stream characterization. Several useful, novel characterizations are described in more detail hereinbelow.

Figure 4:
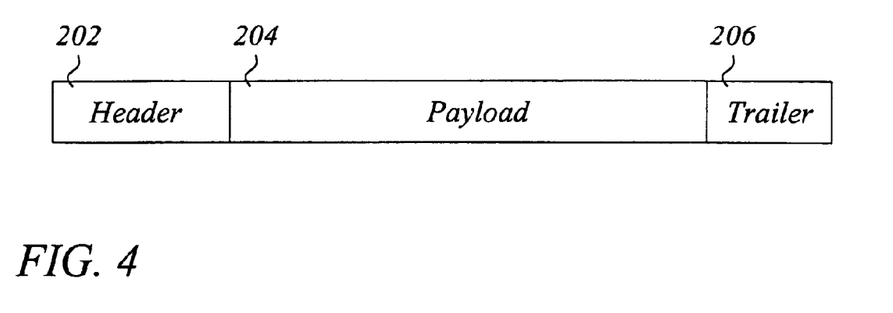
FIG. 4 illustrates the structure of a typical data packet having a header, payload and a trailer.

Data packets carried by the data streams of communications networks generally have a well-defined structure. Typically the data packet structure consists of a header 202, a payload 204, and a trailer 206. The header 202 usually includes routing or destination information as well as a packet identification label. The payload 204 portion contains the data being carried by the packet. Among other things, the trailer 206 often contains some form of error correction code (ECC) information used to insure that the packet arrives at its destination without errors as well as a termination mark indicating the end of the packet. This basic packet structure is illustrated in FIG. 4.

Often, as a given data packet passes through the network, fields within the header and trailer may be modified by the switching elements of the network. However, in all networks there are portions of the data packets that are not intentionally altered or modified while passing through the network. These unaltered portions of the packet are known as the invariant part or portion of the packet.

The data stream characterization produced by the CCU 106 of the system 100 is a set of parameters derived from the invariant portions of a set of packets or collected from a data stream within a defined time window at a specific location in the network. Alternately, the data stream characterization is derived from the invariant portions of a specified number of packets collected following a predetermined start time, or after the occurrence of a specified data pattern in an invariant portion of one or more of the observed packets at a specific location in the network. By generating a data stream characterization based on the invariant parts of the packet, characterizations taken at different points in the network can be compared to look for matches. Matches between characterizations taken at two different points in the network can indicate with an arbitrarily high probability that the characterizations were taken from, and thus represent, the same data stream. In order for characterization matching to work, it is generally assumed that the order of the packets observed in a data stream will be the same at all points in the network. That is to say that the packets will not be re-ordered as they move from switching element to switching element in the network. This is not a particularly severe limitation since many networks do maintain packet order (e.g. Asynchronous Transfer Mode networks). Even when re-ordering takes place, it is possible to perform the characterization matching provided sufficient information concerning the re-ordering is available to the monitoring system. In cases involving re-ordered packets, matching can be accomplished by a similar re-ordering of the data stream characterization parameter set prior to performing the matching operation.

The system 100 still further comprises a configuration processing unit (CPU) 108. The CPU 108 generates the physical configuration of the virtual circuits in the network from the data stream characterizations produced by the CCUs 106. Data stream characterizations produced by the CCUs 106 from data packets collected by the probes 102 at different points in the network are compared by the CPU 108 to identify the physical paths taken by data streams within the network and thereby determine the network configuration. In the preferred embodiment, the CPU 108 is a general-purpose computer running software that performs the CPU 108 functions.

The system 100 of the present invention can be configured to monitor all of the physical links 104 of the network. Alternately, the system 100 may only monitor a subset of the physical links 104. By monitoring all of the links 104 in a network it is possible to generate data stream characterizations for all of the data streams in the network. In turn, these characterizations can be matched with each other to find the physical path taken by each and every data stream.

It is also possible to restrict the number and location of links 104 being monitored. Even without complete monitoring, useful data stream configuration information can be generated by the system 100 of the present invention. For example, if the monitoring system 100 is set up to monitor only the physical links 104 at the periphery of the network (i.e. links adjacent to endpoints), the system 100 can still entirely determine the starting and ending points of all data streams.

In order for data stream characterizations to be compared in an attempt to find matches, the operation of the measurement probes 102 involved should be synchronized with one another. The term 'synchronized' as used herein refers to the coordination of measurement probe 102 operation such that the set of data packets collected by each probe 102 monitoring a given data stream is likely to contain many of the same data packets. Ideally, each probe 102 is synchronized such that each of the probes 102 monitoring a given data stream collect the same data packets. The goal is to insure that the characterizations generated by each of the CCUs 106 are based on the same data for the same data stream. Valid comparisons between data stream characterizations taken at various points in a network generally require that the characterizations are derived from the same set of packets.

For example in networks with fixed and known propagation time delays between probe 102 locations, the sampling of data packets by a given probe 102 can be time-coordinated with the sampling performed by all other probes 102. A number of methods can be used to synchronize the sampling process in networks with fixed time-delays, including but not limited to, distributing a master clock to all of the probes 102.

In networks where the propagation delay is not necessarily fixed, coordination techniques in addition to time-coordination using a master clock generally must be employed. The synchronization of the probe 102 operation in networks with variable time-delays is accomplished using a novel synchronization method employing a 'start hash mask'. The start hash mask is a rare event derived from monitoring the data stream that is used as a trigger that initiates data packet collection at each of the probes 102. This novel synchronization method is the subject of a co-pending application of Simon Love and Graham Pollock entitled "A synchronization method for multi-probe communications network monitoring" filed concurrently, herewith, the contents of which are incorporated herein by reference.

Additional methods of synchronization may be apparent to one skilled in the art for various specific types of networks. All such additional methods of synchronization are within the scope of this invention.

While there are a large number of different data stream characterizations that can be effectively applied to monitor a communications network, four main data stream characterizations have been found to be particularly effective and are presented hereinbelow. The four characterizations are referred to herein as a 'hash' characterization, a 'count' characterization, an 'interval' characterization, and a 'multi-packet' characterization. Each of these characterization forms has its own performance characteristics and the choice of a specific characterization form that is most appropriate for a particular network topology or monitoring application depends on the specific application. The appropriate choice would be readily apparent to one skilled in the art without undue experimentation.

A hash characterization consists of a set or array of hash values generated from a sequence of data packets collected from the data stream. A predetermined number of data packets in the subject data stream are sampled or observed and a hash values are computed from the invariant parts of the packets. The hash characterization can be thought of as a string of hash values that represents the traffic contained in the data stream being monitored. The number of data packets and hence the number of hash values, are flexible and selectable. As discussed hereinbelow, the more hash values that are used during a hash characterization, the longer the string representing the traffic and the more unique the representation become. Given a sufficiently large string of hash values, the probability that a different data stream will produce the same or even similar hash characterization can be made arbitrarily small.

There are several approaches to selecting data packets from the data stream for use in generating the hash values used in the hash characterization. For example, every data packet that is observed during a given collection interval may be used to generate a hash value, one hash value for each data packet observed. If fifty data packets are observed, the hash string generated will have fifty hash values. Alternatively, hash values could be generated only for every j-th data packet ($j \geq 2$). In this case, if j=3 and sixty packets were observed during the sampling interval, the hash string would have 19 hash values. Many other selection approaches are possible and would be readily apparent to one skilled in the art. All such selection approaches are considered to be within the scope of the present invention.

A complete hash characterization for a given monitored data stream includes the hash string or array of hash values described above along with some peripheral information associated with the characterization. The peripheral information is used primarily to facilitate the use of the characterization in later comparisons with other hash characterizations taken at other points in the network. Among the additional information that completes the hash characterization are such things as the location at which the data stream was sampled, the date and time the first packet of the characterization was observed, a 'start' hash value that was used to initiate the characterization, and the number of packets observed. The physical location is the point in the physical network at which the data packets were observed. The date and time of the first packet provide an absolute time reference for when the characterization took place. The 'start' hash value is a predetermined pattern in the invariant part of one or more of the data packets observed in a data stream. A 'start' hash value is chosen such that the likelihood of its occurrence within the maximum propagation delay of a data packet across the monitored network is extremely low. i.e. the start hash value is an infrequently occurring event that is used in addition to time synchronization in order to ensure that measurement probes observe the same set of packets at different points in a network, in spite of the inherent propagation delays that switching points introduce.

An alternative characterization to the hash characterization is the count characterization. As with the hash characterization, the count characterization consists of calculating hash values for a sequence of data packets selected from the collected data packets. The selection can be accomplished in a number of ways as discussed hereinabove with respect to the hash characterization. However, instead of recording an array of the calculated hash values, in the count characterization, the number of times each possible hash value occurs is recorded in an array or string of values. Therefore, the count characterization generates a string containing a count or frequency of occurrence of each hash value rather than a string of actual hash values.

For example, assume that a sequence of twenty data packets is observed and 8-bit hash values were generated from the invariant parts of these data packets. Furthermore assume that hash values {3, 26, 55, 192, and 221} were the only hash values that were generated and that there were (10, 1, 3, and 1) occurrences of these specific hash values, respectively, for the twenty collected data packets. The count characterization would produce a string containing the counts {10, 1, 3, and 1} of the hash values {3, 26, 55, 192, and 221}.

There are a number of ways of recording such frequency or count information. For instance, an array having 256 elements could be constructed and the count corresponding to each possible hash value could be recorded at the appropriate location in the array (e.g. location3 would receive the count10 for the above example). Alternatively, an array could be constructed that listed the hash values observed in one column and the corresponding count in another. Yet another approach would be to construct an array containing pairs of numbers. The first of each pair corresponds to the hash value and the second number corresponds to the count or the number of times that a hash value was generated. Many other approaches to recording the count information would be readily apparent to one skilled in the art and all such approaches are considered to be within the scope of this invention. As in the case of the hash characterization, additional information such as the physical location and date/time of sampling, the start hash value and the number of packets observed may be included in a count characterization.

The interval data stream characterization constructs an array of counts. The counts correspond to the number of packets that occur between occurrences of a packet that produces a 'key' hash value. The key hash value is a pre-selected hash value that is chosen arbitrarily and used as a "marker" to define intervals. The counts recorded in the array are the number of packets that occur in successive intervals as defined by the key hash value markers.

For example, assume that a sequence of thirty data packets is selected from the collected data stream and that 8-bit hash values were generated from the invariant parts of these data packets. Assume that the string of hash values is given by {15, 15, 255, 15, 23, 43, 43, 19, 15, 1, 199, 255, 2, 99, 14, 15, 2, 33, 19, 41, 22, 23, 101, 12, 77, 89, 4, 15, 39, 15} and the key hash value of {15} is chosen. The interval characterization would yield a string {0, 1, 4, 6, 11, 1} for this example. The elements in the interval characterization string are simply the number of packets or hash values between occurrences of the key value '15'. As before, there are many implementations of the interval counting method that would be readily apparent to one skilled in the art. All such implementations are within the scope of this invention. As above, additional information such as the physical location and date/time of sampling, the start hash value and the number of packets observed may be included in an interval characterization.

The multi-packet data stream characterization is similar to the hash characterization in that an array of hash values is produced as a means of characterizing the data stream being monitored. The difference between the hash characterization and the multi-packet characterization is that in the former, hash values are computed on a packet by packet basis and in the latter, hash values are computed for a group of collected data packets. A group is defined as a set of sequential packets selected from the stream. The number of packets in a group is controlled by a pre-determined, arbitrarily chosen, group size value. Once computed, the hash values are stored in an array just as was done in the hash characterization.

For example, assume that thirty data packets are selected from the collected data stream. Furthermore assume that a multi-packet characterization is performed using a group size of five. The multi-packet characterization calculates a single hash value from the invariant portion of the five packets within each group. In this example, a total of six hash values would be generated and stored in an array. As above, additional information such as the physical location and date/time of sampling, the start hash value and the number of packets observed may be included in a complete multi-packet characterization.

Each of the four characterization forms or methods requires that 'hash values' be generated. The hash values are generated using the invariant part of the data packets observed in the data stream being characterized. As referred to herein, a 'hash value' is a numeric value that is a function of the values contained in the invariant part of a packet. There are many different algorithms available and known in the art for generating hash values. These algorithms are collectively known as hashing algorithms or hashing functions. For example, a simple hashing function algorithm sometimes called the "exclusive-Or" or XOR hash function can be used for producing a hash value from the invariant part of a data packet. Among some other well-known hashing algorithms that are useful are 'Prime-number division remainder', 'digit extraction', 'folding', 'radix conversion', and 'Mid-square'. One skilled in the art would readily be able to determine an adequate hashing function without undue experimentation. All such hashing functions are considered to be within the scope of the present invention.

The XOR hash function utilizes a k-bit exclusive-Or (XOR) operator to produce a k-bit hash value from the data being hashed. In particular, the invariant part of the data packet, referred to herein as the 'hashed data', and represented in a binary format, is first divided into an array of N, k-bit segments (e.g. 8-bit for k=8). A so-called 'running hash value', initially set to zero, is then combined using an XOR operator with a first k-bit segment from the array. The resulting k-bit running hash value is then combined with a second k-bit segment using the XOR operator. Each of the k-bit segments of the hashed data is used in succession until all k-bit segments of the hashed data have been combined with the running hash value using the XOR operator. Finally, after all of the N, k-bit segments have been used, the k-bit running hash value becomes the hash value representing the hashed data. The XOR operator as used herein is the conventional binary XOR defined by the following table:

| X | Y | X XOR Y |
|---|---|---------|
| 0 | 0 | 0 |
| 0 | 1 | 1 |
| 1 | 0 | 1 |
| 1 | 1 | 0 |

The hash value for a packet is not a unique representation of that packet. That is to say, data packets with different contents can be represented by the same hash value. However, the hash value calculated for a given data packet with a fixed content will always be the same value each time the hash value is calculated. In addition to the hashing algorithm, there is a choice of precision available with respect to the size of a packet's hash. Typically hash values are based on either an 8-bit or 16-bit precision. Varying the precision allows the user to modify some of the characteristics of hash value used in the data stream characterization. In particular, varying the precision will affect the amount of storage used to hold the hash values and the relative uniqueness of each hash value. The relative uniqueness refers to the probability that two randomly chosen data packets will produce the same hash value.

In general, if the traffic carried by a data stream is assumed to be random, the hash values are produced from successive packets with equal probability. In other words, the probability that a given hash value is 1/n where n is the number of possible hash values that can be produced for a given hash precision and hash algorithm. Similarly, the probability that two consecutive packets in a data stream have the same hash value is $(1/n)^2$. By extension, the probability that m consecutive packets in a data stream have the same hash value is $(1/n)^m$.

A similar argument can be made with respect to strings of hash values calculated from data packets taken from two data streams. The probability that a string of hash values calculated for a set of packets in one data stream is identical to a string of hash values calculated for a set of data packets from an independently chosen data stream is also $(1/n)^m$. The same probability exists for a string of hash values calculated for two independently chosen sets of data packets from the same data stream.

The implications are that (a) the probability of two strings of hash values matching exactly is proportional to the probability that the two sets of data packets match exactly and (b) the probability that two strings of hash values match exactly for two sets of data packets that don't match exactly can be made arbitrarily small by either increasing m, the number of packets used to generate the string, or increasing n, the precision of the hash algorithm, or increasing both m and n. Thus, by sufficiently increasing the number of hash values in a string used for data stream characterization, it is possible to monitor the progress of a set of data packets through a network by comparing strings of hash values. The probability of an incorrect comparison can be made arbitrarily low. The appropriate choice of m and n would be readily apparent to one skilled in the art.

Four data stream characterization methods have been described hereinabove. There are many other characterization methods that are generally applicable, all of which are within the scope of the present invention. In particular, combinations of the above-described four characterizations are within the scope of the present invention. For example, the count characterization can be combined with the multi-packet characterization such that the count occurs over intervals defined by hash values computed from groups of packets.

Additional fields can also be added to these basic definitions of a data stream characterization to take advantage of the specifics of a given network technology. For example, if the monitored network consists of Internet Protocol (IP) traffic being carried over an Asynchronous Transfer Mode (ATM) network using AAL5 encoding, it would be possible to add several additional fields to a data stream characterization that take advantage of this knowledge. These could include the source and destination IP addresses of the IP packets, and the header checksum for each IP packet. Adding additional fields helps to strengthen the data stream characterization. Matches made between characterizations with additional fields will have a higher likelihood of representing the same data than those based simply on the hash strings or hash counts recorded in the basic data stream characterization.

Once the characterizations are produced for each of the data streams being monitored, the characterizations are communicated to a central location for processing. Data stream characterizations taken at various points in the network are compared during processing to discover or determine the paths taken by the data streams through the network. If two characterizations taken at different points in the network that use the same synchronization time and start hash mask are found to be identical upon comparison there is a high probability that these two characterizations were taken from the same data packets. The data stream characterizations are said to show a 'match'.

As noted above, the processing is performed by a configuration processing unit (CPU) 108. In the preferred embodiment, the CPU 108 is a suitably programmed general-purpose computer. In other embodiments, the CPU 108 may be a specialized processor devoted to the configuration processing function. In yet another embodiment configuration processing may be accomplished in a distributed manner with a plurality of configuration processors 108 being distributed throughout the network.

Under normal operation, the set of measurement probes 102 connected to the physical links of a network is instructed to generate a synchronized set of data stream characterizations for the data streams that they observe. Once transferred to the CPU 108, each characterization is then compared, in turn, with other suitable characterizations until a match between characterizations is found. The match may be exact indicating that the two data streams are identical at least within the probability of error associated with the characterization or may have some degree of match or correlation. In the case of an imperfect match, a determination can be made based on the statistical probabilities involved as to whether or not the imperfect match represents a true match or a false match. Both an exact match and an imperfect match have a finite probability of incorrectly indicating a true match. Another way of viewing the matching problem is as an attempt to detect overlaps or corresponding segments in a pair of strings. The length of the overlap between the strings of two different characterizations gives an indication of how similar the two characterizations are. Strings with a small overlap have a low probability of representing the same data stream, while strings with longer overlaps have a higher probability. In general, since a match indicates two points in a network through which a given data stream is traveling, the match can be validated by repeating the characterization process for the pair of points a number of times until the level of certainty required for the match determination is achieved.

In some networks the number of data streams may be very large (i.e. hundreds of thousands). The problem of searching through the possible combinations of characterizations to find two points within the network that carry the same data stream, and hence have matching characterizations, can become very difficult. In these cases it is possible to use statistical techniques to reduce the possible search space when trying to find matches between characterizations. Statistical measurements of the characterization data can be used to reduce the number of combinations that need to be compared.

For instance, if statistical measurements such as the mean, median, standard deviation or autocorrelation are computed for the data in each of the characterizations, only characterization with similar statistics need be compared. In other words, if the data contained in two characterizations have different mean values, they will not match and, therefore, need not be compared. This approach can significantly reduce the number of comparisons needed to find a match and thus will facilitate scaling of the monitoring using characterizations to support the discovery of large numbers of data streams in large networks.

The comparison process can be applied in an iterative manner so that each characterization is compared with existing matches and 'chains' of matches are built up. Each of these chains represents the path of a particular data stream through the network. If measurement probes 102 are monitoring the entire communications network the full path of a data stream can be discovered. By repeating the entire characterization process for the communications network on a regular basis, this approach can be used to dynamically discover when new data streams are added to the network.

Figure 5:
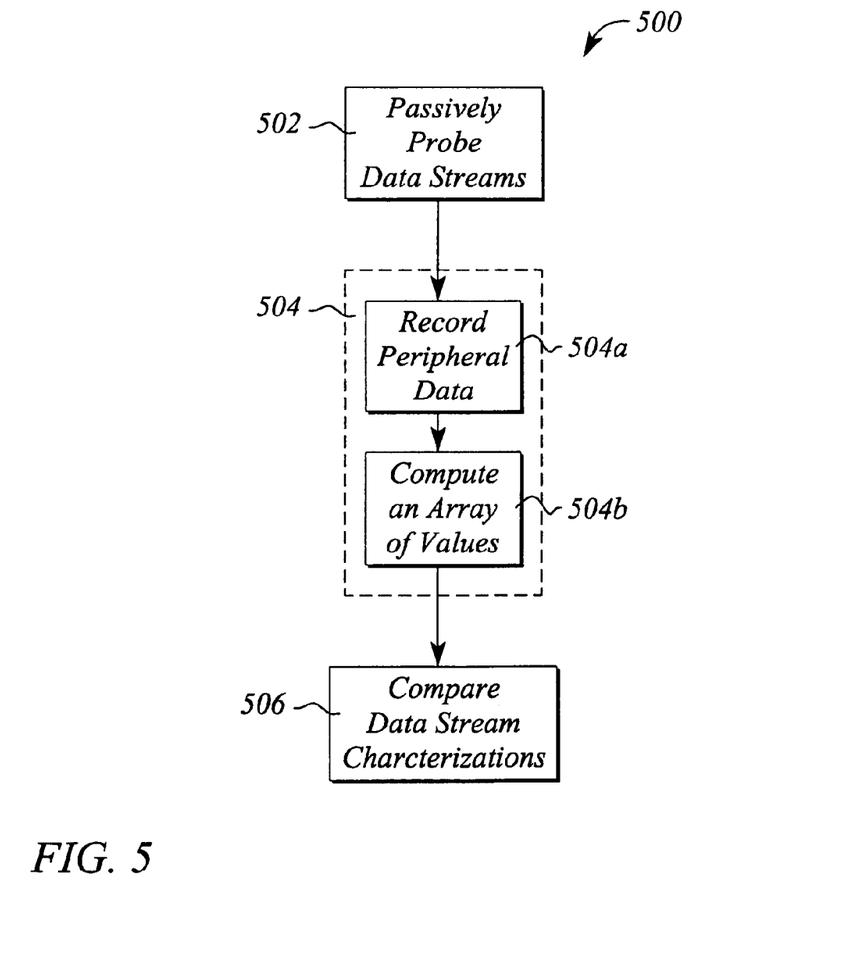
FIG. 5 illustrates a block diagram of a method of monitoring a communications network of the present invention.

A method 500 of network configuration monitoring of the present invention is illustrated in FIG. 5. The method 500 comprises a step of passively probing 502 a plurality of data streams in a network. The step of passively probing 502 produces a set of data packets from the data stream. The method 500 of monitoring further comprises a step of determining 504 a data stream characterization. The data stream characterization is determined from the invariant portions of the set of collected data packets and is a representation of the collected data packets. The step of determining 504 the data stream characterization comprises the steps of recording 504a the peripheral information about the data stream characterization and computing 504b an array of values from the invariant portion of the collected data packets. The method 500 of monitoring further comprises a step of comparing 506 the data stream characterizations to determine matching sets of characterizations. The matching sets of characterization when combined with the peripheral information associated with the characterization are indicative of paths through the network. A set of data stream characterizations that match and that are from different points in the network show the route that the data stream took to travel from source to destination.

Figure 6:
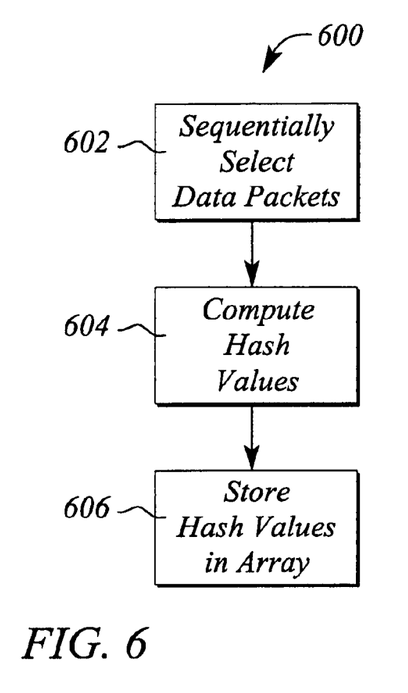
FIG. 6 illustrates a block diagram of a method of hash data stream characterization of the present invention.

In one embodiment of the method 500 of network configuration monitoring, the step of determining 504 comprises the step of computing 504b' that uses a method 600 of characterization called a hash characterization. The method 600 of hash characterization is illustrated in FIG. 6. The method 600 comprises the step of sequentially selecting 602 data packets from the set of collected data packets. The method 600 further comprises the step of computing 604 a hash value from the invariant portion of each of the selected data packets. Each hash value computed corresponds to one of the members of the subset of collected data packets. The method 600 further comprises the step of storing 606 the values in an array. Every j-th, {=1 . . . J}, packet from the collected set is selected during the step of selecting 602, where J<m and m is the number of packets in the collected set.

Figure 7:
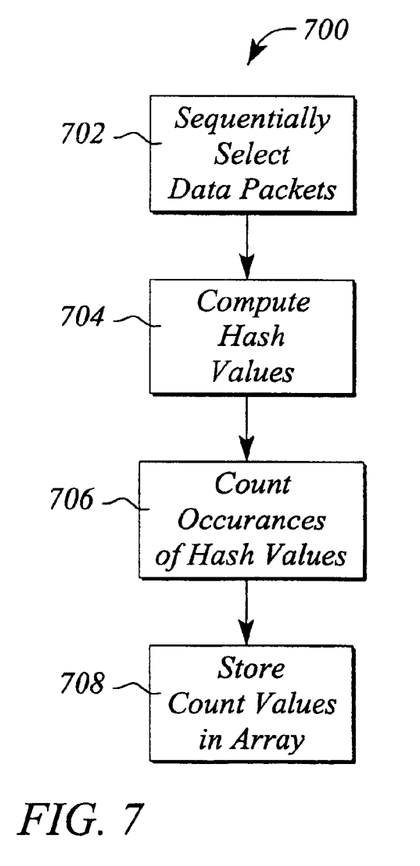
FIG. 7 illustrates a block diagram of a method of count data stream characterization of the present invention.

In another embodiment of the method 500, the step of determining 504 comprises the step of computing 504b" that uses a method 700 of characterization called a count characterization illustrated in FIG. 7. The method 700 of count characterization comprises the step of sequentially selecting 702 data packets from the set of collected data packets. The method 700 of count characterization further comprises the step of computing 704 a hash value from the invariant portion of each of the selected data packets. The method 700 further comprises the step of counting 706 the occurrences of each of the possible hash values. The method 700 still further comprises the step of storing 708 the count values for each of the computed hash values in an array. The actual form of the stored count values in the array can be any one of several as described hereinabove.

Figure 8:
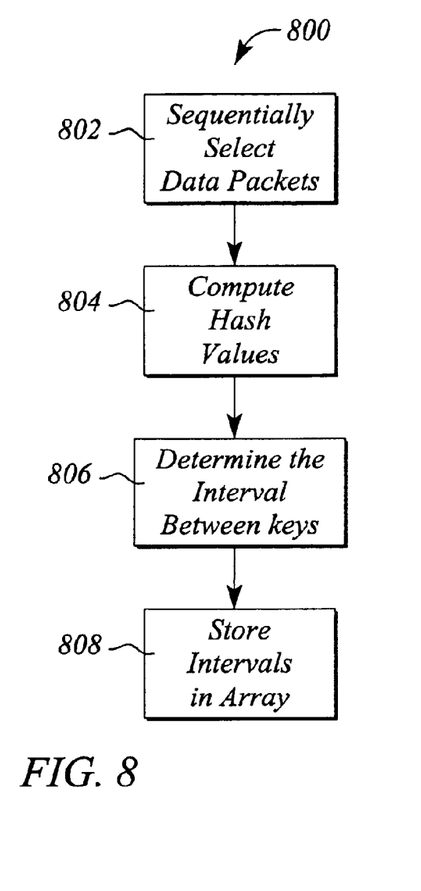
FIG. 8 illustrates a block diagram of a method of interval data stream characterization of the present invention.

In yet another embodiment of the method 500, the step of determining 504 comprises the step of computing 504b'" that uses a method 800 of characterization called an interval characterization that is illustrated in FIG. 8. The method 800 of interval characterization comprises the step of sequentially selecting 802 data packets from the set of collected data packets. The method 800 of interval characterization further comprises the step of computing 804 a hash value from the invariant portion of each of the selected data packets. The method 800 further comprises the step of determining the interval 806 between occurrences of a pre-selected hash value. Determining the interval 806 is the same as counting the number of hash values that occur between occurrences of a pre-selected key hash value. The method 800 still further comprises the step of recording 808 the intervals in an array. The actual form of the stored interval values in the array can be any one of several as described hereinabove.

Figure 9:
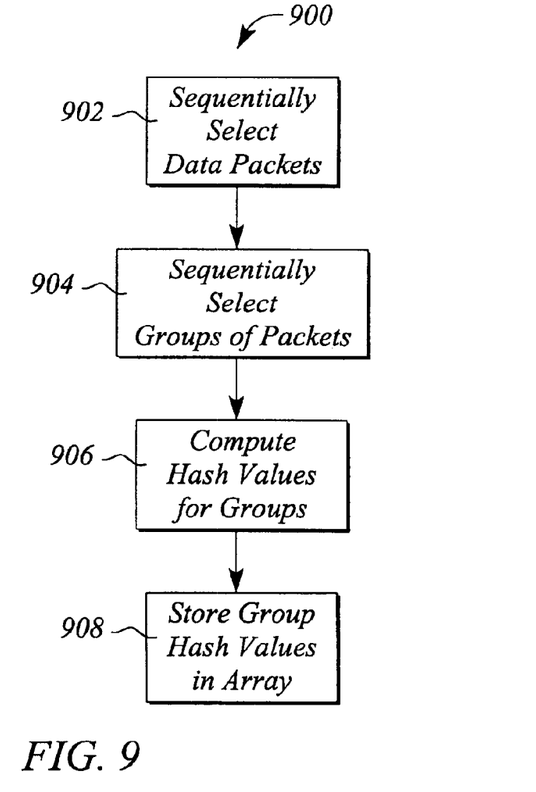
FIG. 9 illustrates a block diagram of a method of multi-packet data stream characterization of the present invention.

In still yet another embodiment of the method 500, the step of determining 504 comprises the step of computing 504B"" that uses a method 900 of characterization called a multi-packet characterization. The method 900 of multi-packet characterization is illustrated in FIG. 9 and comprises the step of sequentially selecting 902 data packets from the set of collected data packets to produce a subset of selected data packets. The method 900 of multi-packet characterization further comprises the step of sequentially selecting groups 904 of packets from the selected subset of selected data packets. The method 900 still further comprises computing 906 a hash value from the invariant portions of each of the data packets of each of the selected groups. The method 900 yet still further comprises the step of storing 908 the computed group hash values in an array.

The communication network monitoring system 100 and method 500 of the present invention provide for fully automated network monitoring that discovers the network configuration by observing the traffic carried by the network. The automated nature of the system 100 and method 500 eliminates the need for manual entry of data stream configuration information that is characteristic of the manual monitoring systems known in the art.

The communications monitoring system 100 and method 500 of the present invention are independent of network topology and can be applied to networks with many different topological configurations. In addition, the monitoring system 100 and method 500 of the present invention do not require either access to external sources of configuration data or active access to the network. This is in contrast to systems of the prior art that can only be used with certain network topologies or require the used of specific network management protocols or signaling messages.

The system 100 and method 500 depend entirely on passive access to the physical links of the network. Therefore, unlike systems of the prior art that inject test traffic or otherwise actively control portions of the network, the system 100 and method 500 of the present invention will not degrade the performance of the network being monitored. In addition, the use of strings of hash values or related values allows the data stream characterizations to be made arbitrarily unique insuring that a favorable trade-off can be made between characterization complexity and probability of error for all applications.

Further, the system 100, method 500, and methods 600, 700, 800, and 900 can be used to discover and monitor new data streams in a dynamically evolving network by deriving data stream characterizations on a continuous basis from data within the operating network. Also, unlike existing systems, in particular those with some manual entry requirements, the system 100 and method 500 of the invention can be easily scaled as the network grows in size.

Thus there have been described a novel automatic configuration monitoring system 100 and method 500 for monitoring communications networks. In addition, four novel data stream characterization methods 600, 700, 800, and 900 have been described that are useful in conjunction with the configuration monitoring system and method of the present invention. It should be understood that the above-described embodiments are merely illustrative of the some of the many specific embodiments that represent the principles of the present invention. Clearly, those skilled in the art can readily devise numerous other arrangements without departing from the scope of the present invention.

What is claimed is:

1. A system for monitoring a communications network having data streams that carry data packets between a plurality of nodes by way of physical connections comprising:

a plurality of measurement probes, each probe for passively collecting the data packets carried by a data stream in a physical connection to produce a set;

a plurality of characterization computational units, each characterization computational unit for receiving the set of collected data packets from a respective one of the plurality of probes and for producing a data stream characterization from the set; and a configuration processing unit for generating a system configuration for the communications network from the data stream characterization.

2. The system of claim 1, wherein the data stream characterization produced by each characterization computational unit comprises an array of hash values computed from an invariant portion of selected data packets taken from the set of collected data packets.

3. The system of claim 2, wherein the array of hash values are computed using an XOR hash algorithm.

4. The system of claim 1, wherein the data stream characterization produced by each characterization computational unit comprises an array of counts of a number of times each possible hash value occurs when hash values are computed from an invariant portion of selected data packets taken from the set of collected data packets.

5. The system of claim 4, wherein the array of hash values are computed using an XOR hash algorithm.

6. The system of claim 1, wherein the data stream characterization produced by each characterization computational unit comprises an array of counts, the counts corresponding to a number of packets between occurrences of a packet that produces a key hash value when hash values are computed from an invariant portion of selected data packets taken from the set of collected data packets.

7. The system of claim 6, wherein the array of hash values are computed using an XOR hash algorithm.

8. The system of claim 1, wherein the data stream characterization produced by each characterization computational unit comprises an array of hash values computed from groups of data packets, one hash value for each group of data packets, wherein the groups are produced by selecting subsets from the set of collected data packets.

9. The system of claim 8, wherein the array of hash values are computed using an XOR hash algorithm.

10. The system of claim 1, wherein the system configuration is generated by successively comparing data stream characterizations to find matching pairs of characterizations.

11. A method for monitoring a communications network having data streams that carry data packets between a plurality of nodes by way of physical connections comprising the steps of:

passively probing one or more of the physical connections to produce one or more sets of collected data packets from the data streams;

determining a data stream characterization from each the sets of collected data packets; and comparing the data stream characterizations to one another to identify matching characterizations.

12. The method of claim 11, wherein the step of determining comprises the steps of:

recording peripheral information associated with the data stream characterization; and computing an array of values from an invariant portion of the set of collected data packets.

13. The method of claim 12, wherein the step of computing the array of values comprises the steps of:

selecting data packets from the set of collected data packets;

computing a hash value from the invariant portion of the selected data packets, wherein one hash value is computed for each of the selected data packets; and storing the computed hash values in an array.

14. The method of claim 13, wherein the step of computing a hash value uses an XOR hash algorithm.

15. The method of claim 12, wherein the step of computing the array of values comprises the steps of:

selecting data packets from the set of collected data packets;

computing a hash value from the invariant portion of the selected data packets, wherein one hash value is computed for each of the selected data packets;

counting each occurrence of each hash value; and storing the counted occurrences in an array.

16. The method of claim 15, wherein the step of computing a hash value uses an XOR hash algorithm.

17. The method of claim 12, wherein the step of computing the array of values comprises the steps of:

selecting data packets from the set of collected data packets;

computing a hash value from the invariant portion of the selected data packets, wherein one hash value is computed for each of the selected data packets;

counting a number of hash values that occur between each occurrence of a pre-selected key hash value; and storing each of the counted numbers in an array.

18. The method of claim 17, wherein the step of computing a hash value uses an XOR hash algorithm.

19. The method of claim 12, wherein the step of computing the array of values comprises the steps of:

selecting data packets from the set of collected data packets to produce a subset of selected data packets;

selecting data packets from the subset of selected data packets to produce groups of data packets;

computing a hash value from the invariant portion of the data packets in each of the groups, wherein one hash value is computed for each group of data packets; and storing the computed hash values in an array.

20. The method of claim 19, wherein the step of computing a hash value uses an XOR hash algorithm.

* * * * *

UNITED STATES PATENT AND TRADEMARK OFFICE
CERTIFICATE OF CORRECTION

PATENT NO. : 6,904,020 B1
DATED : June 7, 2005
INVENTOR(S) : Love et al.

It is certified that error appears in the above-identified patent and that said Letters Patent is hereby corrected as shown below:

Title page, Item [54] and Column 1, line 3,
Title, delete "CHARACTERIZATION" and insert -- CHARACTERIZATIONS --.

Column 17,
Line 41, after "each" insert -- of --.

Signed and Sealed this

Twentieth Day of December, 2005

JON W. DUDAS
*Director of the United States Patent and Trademark Office*